Oct. 15, 1957  F. S. ALLINQUANT  2,809,825
DAMPED SUSPENSION
Filed Nov. 23, 1954  6 Sheets-Sheet 1
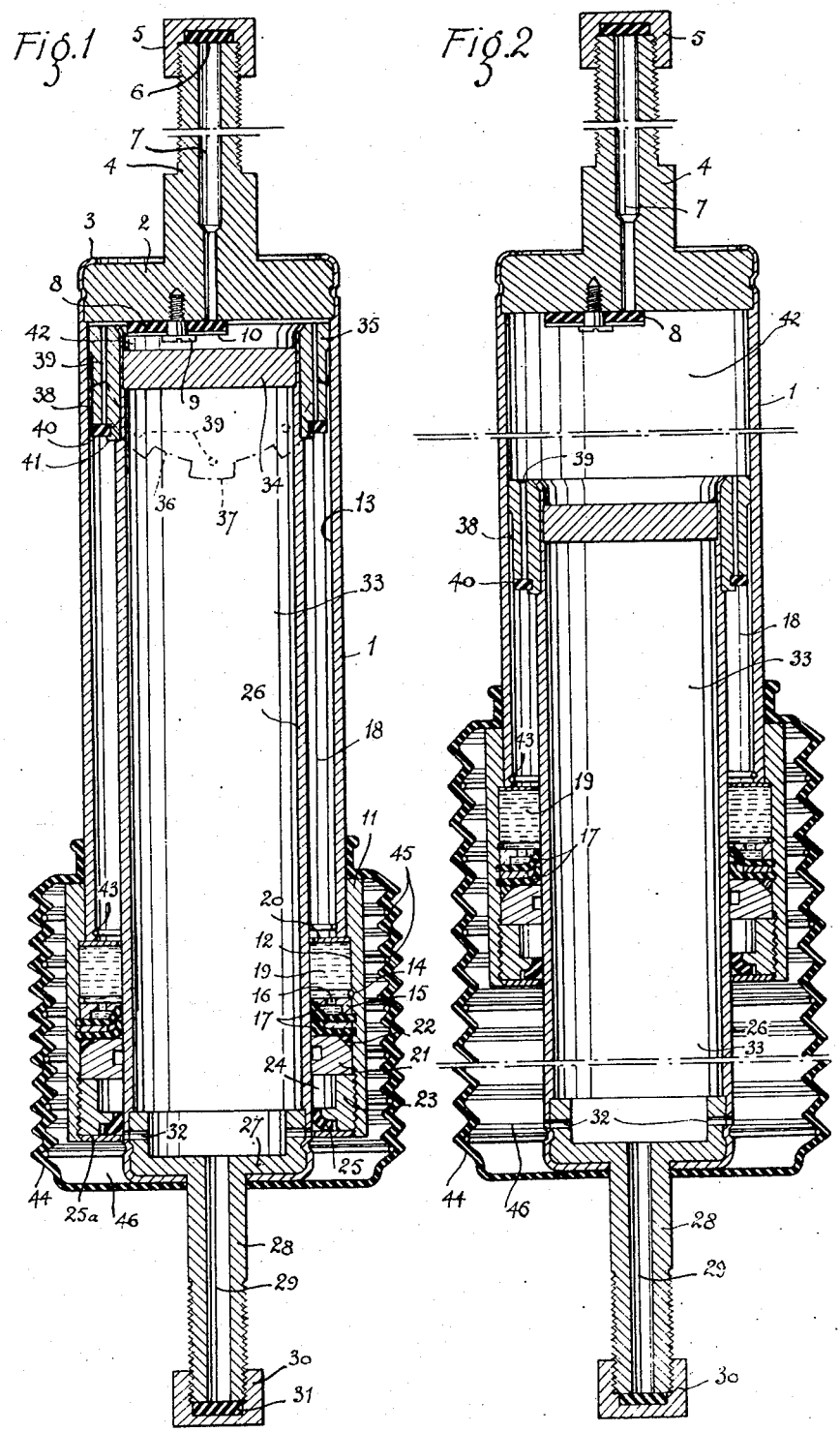

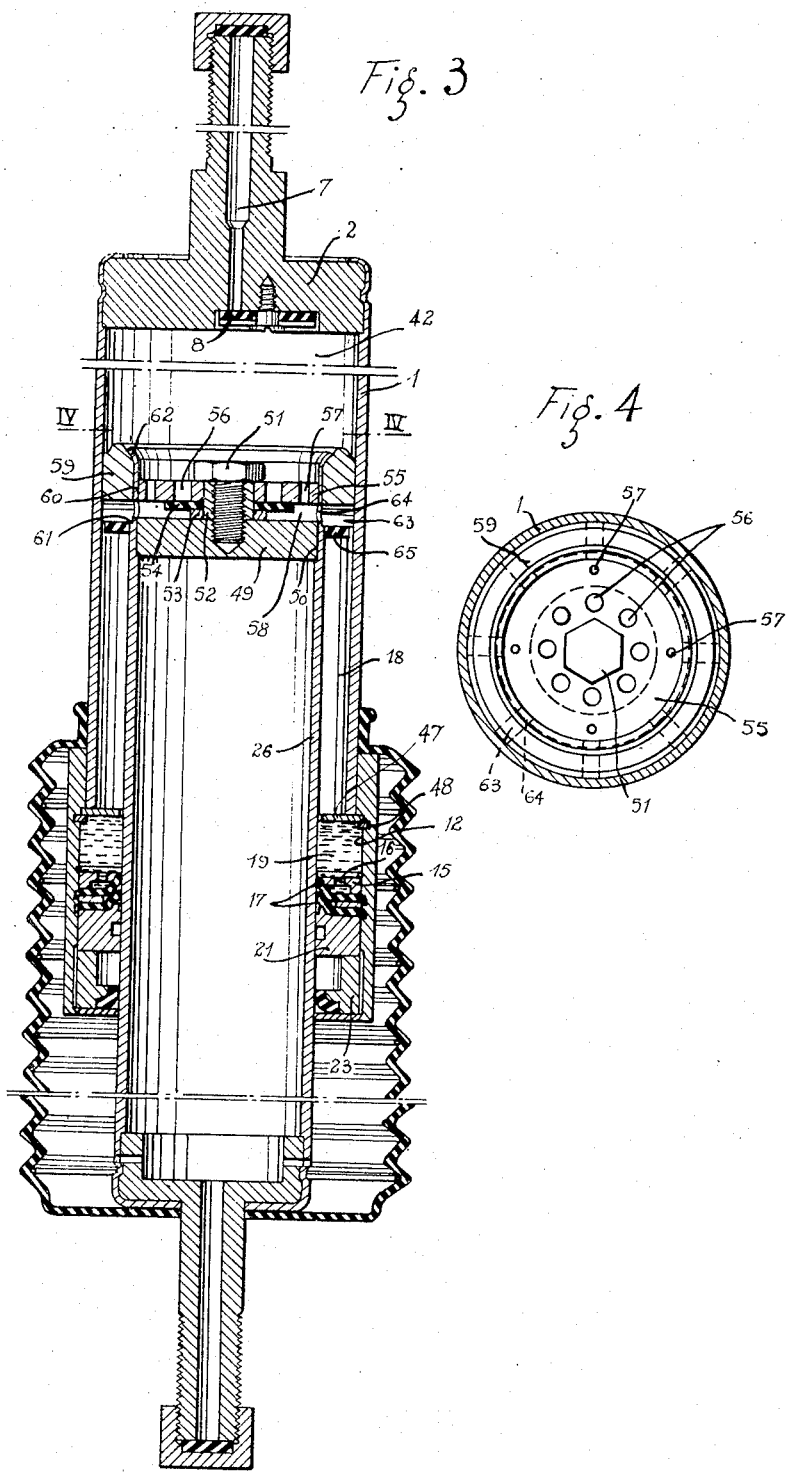

Oct. 15, 1957

F. S. ALLINQUANT 2,809,825

DAMPED SUSPENSION

Filed Nov. 23, 1954

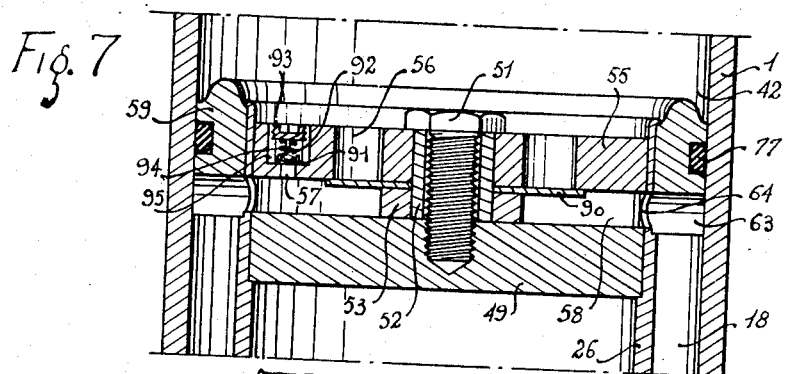
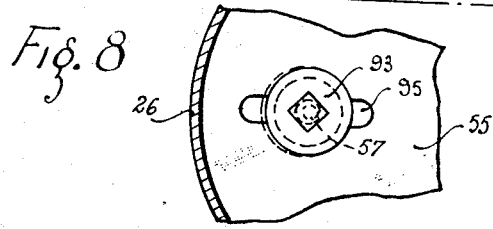
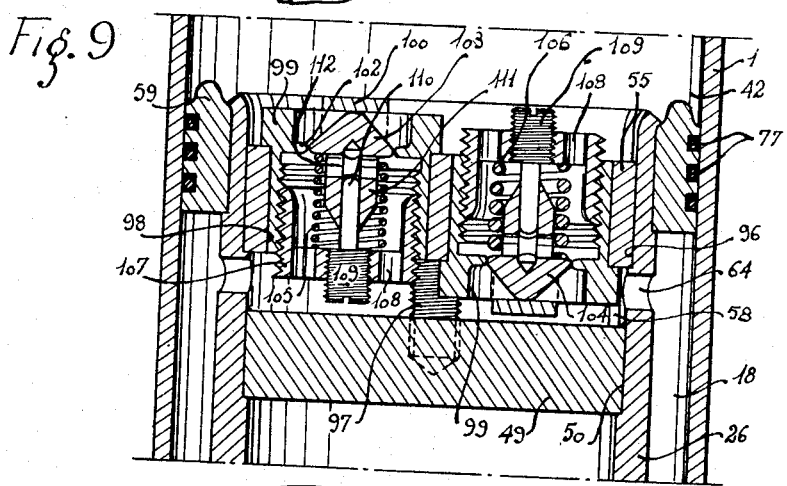
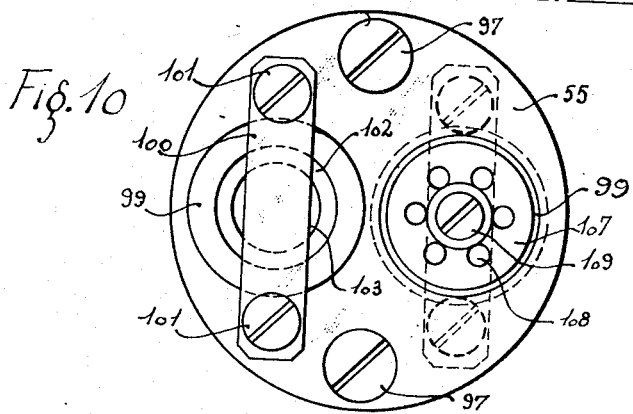

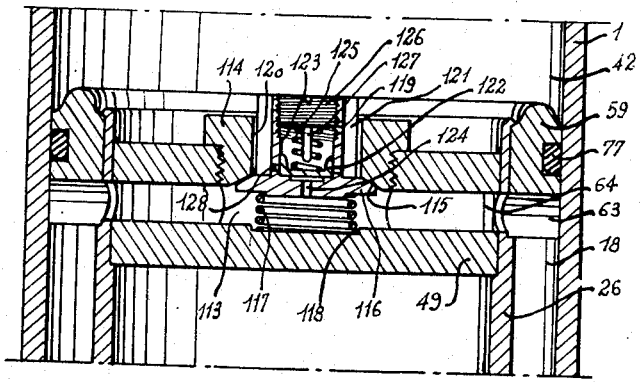
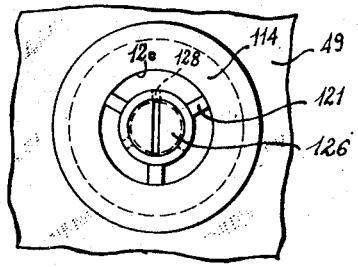
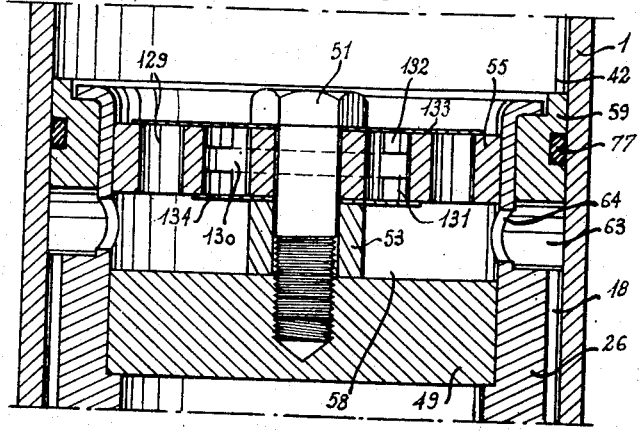
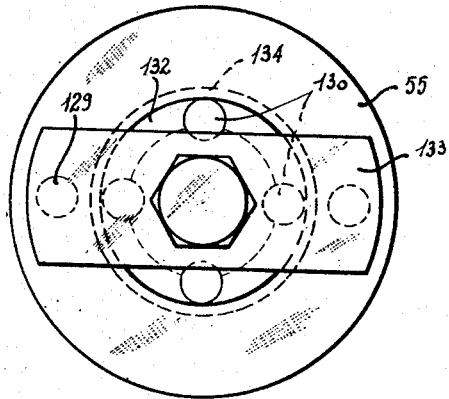

Oct. 15, 1957

F. S. ALLINQUANT 2,809,825

DAMPED SUSPENSION

Filed Nov. 23, 1954

United States Patent Office 2,809,825
Patented Oct. 15, 1957

2,809,825

DAMPED SUSPENSION

Fernand Stanislas Allinquant, Paris, France

Application November 23, 1954, Serial No. 470,741

Claims priority, application France November 26, 1953

5 Claims. (Cl. 267—65)

In vehicles of a recent design, the chassis is connected with the wheels both through an elastic suspension and through a damping device, which has for its action to brake the oscillations of the latter.

It has already been proposed to make the same device operate as a suspension and as a damper. A known embodiment resorts, for obtaining elasticity, to the capacity of compression of compressed air and for damping purposes, to the viscosity of a liquid. This prior arrangement includes two cooperating cylinders of which one, the diameter of which is smaller than the inner diameter of the second cylinder, slides inside a ring defining the length of movement of the first cylinder inside the second cylinder and carries at its end an annular piston sliding inside the first cylinder and provided with ports of a small area for the passage of fluid through it. The larger diameter cylinder is positioned at the lower end of the arrangement and the smaller diameter cylinder is located above it while the variable volume capacity is subdivided into two superposed compartments by the annular piston and contains oil up to a level located above the large diameter cylinder, the remainder of said capacity being occupied by compressed air. The expansion of said air produces the elastic force required for the suspension and the relative movements of the two cylinders are braked by the resistance opposing the flow of oil through the piston, which ensures the damping action of the suspension.

Such an elastic damped suspension shows, by reason of the use of oil as a damping medium, drawbacks which are inherent to the non-compressible nature of liquids; as a matter of fact, the surfaces of the piston bearing against the damping liquid follow exactly the modifications in volume of the oil contained inside the two cylinder compartments at each relative outward movement of the two cylinders and also at each compression stroke in the absence of any cavitation and, consequently, the compressed air acts only so as to produce a sustaining force without the arrangement deriving any actual benefit by the resiliency provided by the compressible nature of the said compressed air.

My invention has chiefly for its object the combination of elastic suspension means operating through compressed air with means for damping the expansion of the compressed air, operating also through compressed air; this means that I associate an elastic suspension constituted by a piston sliding inside a cylinder filled with compressed air, with a dash-pot system so as to brake the resilient return movement of the suspension. It also covers the dash-pot damping system considered per se and independently of the nature of the suspension with which it is associated.

In a preferred embodiment of my invention, the dash-pot is constituted by the same parts as the suspension, the piston providing, for the passage of the air compressed by the movement of the said piston, passageways opposing a reduced resistance during the compression strokes and a large resistance during the return strokes so as to ensure operation in the manner of a dash-pot.

My invention has also for its object various embodiments of these channels opposing different resistances and it also has for its object a fluidtight device adapted to prevent any leaking of air through the sliding joint provided on the piston rod.

I have illustrated my invention in the following drawings showing various embodiments of my said invention. In said drawings:

Figs. 1 and 2 are axial sectional views of an embodiment of a damped suspension for two different positions of operation, the drawing of the device being shortened through transverse cuts.

Fig. 3 is a similar view of a further embodiment.

Fig. 4 is a transverse section through line IV—IV of Fig. 3.

Fig. 7 is an axial sectional view of a second modification of the piston illustrated in Fig. 3.

Fig. 8 is a plan view of a detail of Fig. 7.

Fig. 9 is a view similar to Fig. 7 of a third modification of the piston.

Fig. 10 is a plan view of a section of Fig. 9.

Fig. 11 is a view similar to Fig. 7 of a fourth modification of the piston.

Fig. 12 is a plan view of a detail of Fig. 11.

Fig. 13 is a view similar to Fig. 7 of a fifth modification of the piston.

Fig. 14 is a plan view of a section of Fig. 13.

Figure 5:
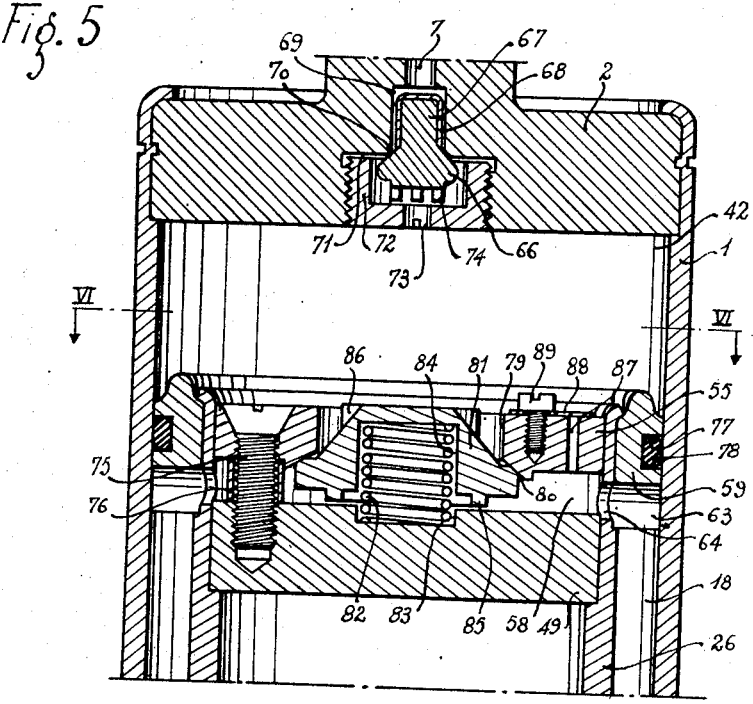
Fig. 5 is an axial cross-section through a modification of the upper cylinder cover and of the piston of the embodiment of Fig. 3.

I will first refer to the embodiment illustrated in Figs. 1 and 2 of a damped suspension incorporating suspension-forming means and means for braking the movements of the suspension. The device is of a telescopic type including two interengaging elements connected respectively with the two parts between which it is desired to provide a damping suspension and these elements will be designated hereinafter as a whole by the words "cylinder" and "piston," the cylinder being preferably located above the piston.

The cylinder is constituted by a tube 1 which is closed at its upper end by a cover or cylinder head 2 fitted in a section of the tube bored to a diameter which is slightly larger than the inner diameter of the remainder of the tube. The edge 3 of the tube is crimped over said plate and fluidtightness is ensured by a packing or by welding, soldering or the like means. A rod 4 having a threaded end and rigid with the outside of the cover forms the means for securing the cylinder to the corresponding part of a vehicle. Said rod may carry a tapped plug 5 provided with a fluidtight packing 6 so as to close a bore or channel 7 formed axially of said rod and opening into the cylinder. The inner end of said bore is closed by a flap valve constituted by a rubber valve-forming washer 8 which is held eccentrically against the cylinder cover by a screw 9 passing through the center of the washer and the head of which bears against a metal foil 10 resting on the washer surface and forming a spring returning the washer into its channel-closing position. The pressure inside the cylinder, when it is higher than that outside same, urges the valve 8 against the bottom of the cylinder so as to close fluidtightly the channel 7. It is however possible to release said pressure by raising the valve off its seat by engaging a stem inside the bore 7 and urging it against the flap valve.

On the opposite end of the tube 1 forming the cylinder is fitted a sleeve 11 constituted by an extension of the said cylinder, the inner diameter of the bore 12 of which extension is slightly larger than that of the bore 13 of the actual tube 1. In an intermediate section of the said bore is held an annulus 14 forming a stop for a ring 15 engaged by two fluidtight washers 17. The outer surface of the bearing ring 15 is recessed in its central portion and it is provided with ports 16 opening into said recessed portion of its inner surface. Its inner periphery is engaged by the rubber washers 17 spaced throughout their periphery by a metal washer. The rubber washers 17 have an outer diameter which is somewhat larger than the diameter of the bore 12 so as to engage elastically shallow peripheral grooves in the inner surface of the cylinder extension whereby they are held flat along their periphery as soon as they are positioned. Their inner diameter, when free, is smaller than the outer diameter of the sliding piston section or tubular body 26 passing through the fluidtight packing constituted by said rubber washers. The latter are thus deflected towards each other inwardly and they engage, therefore, the sliding section by reason of their natural elasticity. Furthermore, the pressure prevailing inside the annular space 18 surrounding the said section inside the cylinder is exerted on the washers 17 through the ports 16 in the ring 15 since it is transmitted by a mass of thick lubricant 19 occupying the gap between the ring 15 and a metal foil washer 20 at the inner end of the bore 12 in the cylinder extension 11. This pressure urges the edge of the inner washer 17 not only against the sliding piston section but also against the edge of the outer washer 17 which is thus energetically pressed against the said sliding section. The two-stage packing obtained by this arrangement provides perfect fluidtightness.

A ring 21 is urged against the outer fluidtight washer 17 and serves as a guide for the sliding piston section and into its inner bearing surface is cut a lubricant-retaining groove. The said ring bears through a frustoconical bevel facing the washers 17 against a peripheral packing 22 which, when clamped in position, occupies the space left free by said bevel and provides for fluidtightness in contact with the wall of the cylinder extension 11. The ring 21 fitted through a press is held in its turn by a fastening ring 23 which is threaded so as to be screwed inside the tapped end of the cylinder extension 11. Said ring 23 is provided with a chamber 24 adapted to contain a provision of lubricant and it carries a rubber scraper 25 bearing against the sliding piston section and held in position by a cover 25a over which the outer edge of the cylinder extension 11 may be crimped.

The piston includes the above-mentioned tubular piston section or body 26 engaging with the required clearance the washer 20 and the rings 15 and 23 of the fluidtight arrangement, said piston member being guided by the ring 21 and engaging the fluidtight washers 17 and scraper 25. Said tubular piston body 26 is closed outwardly by a cover 27 carrying a threaded attaching rod 28 through which extends an axial channel 29 adapted to be closed by a tapped plug 30 provided with a fluidtight packing 31. The lateral wall of the piston body near the cover is provided with ports 32 connecting the inside 33 of the said piston body with the outside. This space is closed at the other end of the tubular body by a disc 34 fitted in the inner end of the outer section of the tubular body, the diameter of which is somewhat larger than the inner diameter of the remainder of said body, the disc being secured inside said outer section by means of a fluidtight weld.

The end of the tubular body 26 carries the actual annular piston head 35 the larger diameter of which corresponds with that of the bore 13 in the cylinder with a slight clearance therebetween so as to ensure a free sliding movement of the piston. In the extreme section of said head, castellations 36, the shape of which is shown in the folded-back section of Fig. 1 in dot-and-dash lines, define guiding projections 37 of a limited peripheral extent. The outer diameter of the part of the piston head 35 extending on the inside of said castellations has a size which is clearly smaller than the bore 13 in the cylinder so as to form restricted annular passages 38 opening into the castellations 36. Inside the wall of the tubular piston member are formed a series of bores 39 parallel with the axis of the piston and the openings of which on the side facing the annular chamber 18 between the piston and the cylinder are closed by a flap valve 40, constituted by a rubber washer held in position by the crimping over it of a flange 41 on the annular piston head, said flange engaging the inner edge of said washer 40.

The piston head 35 separates thus from the annular space 18 the terminal space 42 separating the cylinder cover from the piston, except in the direction of flow between the space 42 and the space 18 for which the flap valve 40 offers no resistance to the flow of compressed air through the bores 39. The travel of the piston is limited in the compressional direction by the abutment between the piston head 35 and the cover 2 of the cylinder (Fig. 1), the disc 34 fitted in the outer section of the piston body being recessed in its upper end to provide space for housing the flap valve 8 and the head of the screw 10. In the opposite direction, an annulus 43 at the end of the bore 13 of the cylinder stops the piston head travelling in the space 18.

Between the cylinder 1 and the piston body 26 is mounted an expansible fluidtight casing 44 adapted to fold accordionwise, said casing being reinforced by wire rings 45 located inside the casing to engage the bottom of the folds at regular intervals. The lower axially perforated end of the casing may be held round the lower end of the attaching rod 28 through suitable securing means carried by the rod and not illustrated, while the outer periphery of the casing is fitted round the body of the cylinder 1 and may, if required, be held in position by a collar or flange. The fluidtight casing 44 encloses the outer end of the cylinder and the projecting section of the piston body inside a closed space 46 and protects their sliding joint against dust from the outside.

The arrangement operates as follows: the plugs 5 and 30 are first removed from the attaching rods. The chamber 33 inside the piston body communicates then with the outer atmosphere through the channel 29 in the attaching rod 28. The connection constituted by the other uncovered attaching rod 4 is then connected with a pipe feeding compressed air. The latter entering the channel 7 raises the flap valve 8 on the cylinder cover and enters the terminal space 42 in the latter and urges the piston outwardly. During this time, the outer air enters the chamber 33 inside the piston body and, through the port 32, the fluidtight chamber 46 defined by the expansible casing 44, which latter expands as the piston body moves outwardly of the cylinder until it is stopped through the abutment of the piston head against the annulus 43.

When this position is reached, the chambers 33 and 46 are submitted to atmospheric pressure while the pressures in the spaces 42 and 18 are the same and should be equal to about 15 kg. per sq. cm. The connection with the admission of compressed air is then removed while the flap valve 8 prevents the air from escaping out of the space 42; the two plugs 5 and 30 are reinserted on the corresponding attachment rods and the fluidtightness is all the greater when the filling pressure is higher. The arrangement is thus ready for operation and it may be secured in the usual manner through the two attachment rods 4 and 28. It is then submitted to the weight of the suspended section of the vehicle and stabilized in a mean position for which the pressure inside the cylinder may range between about 20 and 25 kilograms per sq. cm. This pressure corresponds to a sustaining force equilibrating the weight of the part of the vehicle, the suspension of which is provided by the arrangement described. The expansible chamber 46 assumes a smaller volume but since it communicates with the chamber 33 of which the volume is invariable, the pressure inside the two chambers is but slightly above atmospheric pressure.

Starting from an average inoperative position (Fig. 2), it is apparent that the piston cannot enter any further inside the cylinder during its compression stroke without compressing the air inside the space 42, which air is urged partly into the annular space 18 through the ports 39 as allowed by a raising of the flap valve 40, without any resistance being met, so that the same pressure prevails in the annular space 18 and in the terminal space 42. To the pressure prevailing inside the space 42, there corresponds a thrust which, after subtraction of the antagonistic thrust produced by the pressure inside the annular space 18, produces a force which is larger than that which equilibrates statically the weight of the suspended section. The difference between said forces produces a resilient return or rebounding movement of the piston. But as soon as said return is initiated, the pressure inside the annular space 18 increases so that the flap valve 40 engages the openings of the ports 39 and the air which is submitted to a supplementary compression inside said space 18 can pass now over the head of the piston only through the restricted annular air passage provided by the clearance 38. The thrust produced in the opposite direction by the over-compressed air inside the space 18, has a tendency to balance the force urging the piston back but since air passes through the restricted passage at 38 as long as any pressure is extant, the movement of the piston is only braked under the action of the dash-pot system thus obtained.

It is clearly apparent from the preceding disclosure that the arrangement is readily adjustable in contradistinction with prior arrangements, wherein the damping was obtained through the use of a mass of oil adapted to pass through the piston head. As a matter of fact in such prior arrangements, the piston follows exactly during its return movement the modifications in the volume of the noncompressible liquid inside the annular space defined by its head, while in the arrangement that has just been disclosed, its movements follow the modification in pressure of a compressible fluid.

The above-described fluidtight arrangement opposes all leafls of air by reason of the fact that the air in the annular space 18 transmits its pressure to the packings 17 through the agency of a thick intermediate lubricant so as to urge said packing against the tubular body 26 of the piston with an energy which is all the more considerable when said pressure is higher.

Experience shows that under such conditions, the pressure obtained when mounting the arrangement remains operative during a long time although of course the arrangement should be reinflated from time to time so as to make up for the small unavoidable losses. Furthermore, experience shows, in conformity with theory, that the heating is practically negligible, since any compression of a fluid is followed by an expansion which absorbs the energy dissipated during the compression in the form of heat. The seating of the vehicle remains thus constant throughout its use.

It should also be remarked that the expanding or contracting movements of the expansible fluidtight casing 44 are not hindered by large variations in pressure. The pressure inside the said casing is equal to about atmospheric pressure when it has expanded to a maximum so that the casing cannot collapse into contact with the parts it encloses and when contracted to a maximum, the casing resists the excess pressure applied to it by reason of its very structure.

The embodiment of a damped suspension of the type illustrated in Figs. 3 and 4, differs from that illustrated chiefly through the execution of the end of the piston head. However, a modification is brought to the arrangement limiting the return stroke of the piston inasmuch as a washer 47 is provided, the opening in which is substantially larger than the diameter of the tubular piston body 26, said washer being held through its abutment against the outer edge of the actual cylinder tube 1 by an annulus 48 urging it against the bottom of the enlarged extension of the cylinder. Said washer 47 defines the space 19 containing the grease. A further modification consists in housing the washer 8 acting as a flap valve at the upper end of the cylinder inside a circular recess the diameter of which is slightly larger than that of the inner surface of the bottom of the cylinder head 2 in a manner such that the washer does not project outside the surface of the cylinder head.

The hollow piston head which is filled with air is closed at its outer end, as in the embodiment of Fig. 3, by a solid cover constituted in the case illustrated by a thick solid circular member 49 fitted with a force fit inside the tubular piston body 26 and welded fluid tightly into same at a distance from its outer end in the bottom of a bore 50 formed in said end of the tubular body. To this solid bottom are secured in superposition by means of a central screw 51, a washer of a small diameter 53 bearing in its turn a rubber washer 54 of a larger diameter and a perforated partition 55 fitted inside the bore 50, the screwing down of these parts 53—54—55 being limited by the length of a tubular stay 52 engaging them axially. The partition 55 is provided with two series of openings of which the major part are of a larger diameter as shown at 56 and are arranged annularly round the axis of the partition in register with the washer 54 closing them in the manner of a flap valve while the other openings 57 which are less numerous are of a suitable small diameter and are distributed at the periphery of the partition so as to connect permanently the terminal space 42 in the upper end of the cylinder with the space 58 extending inside the tubular member 26 between the perforated partition 55 and the solid partition forming the actual piston cover 49.

The spaces 42 and 18 are separated by an annular piston head 59 which is fitted on a smooth bearing 60 formed on the tubular piston body 26 on the outside of the shoulder 61 defining said smooth bearing at a level located slightly underneath the upper surface of the partition 49, said piston head being held in position by a crimping 62 at the end of the tubular body 26. The lower surface of said piston head 59 is provided with a number of castellations 63 which are deep enough to open substantially at the level of the lower surface of the partition 55 while ports 64 are formed in the wall of the tubular body 26 is register with each castellation so as to freely connect the space 58 with the annular space 18. To the lower surface of the piston head 59 is secured a rubber washer 65 acting as a damping pad for the abutment between the piston head and the washer 47 forming a stop for said piston head at the lower end of the annular space 18.

The operation is the same as in the embodiment described with reference to Figs. 1 and 2. When inoperative, and during the compression stroke, the air compressed inside the arrangement assumes constantly the same pressure in the spaces 42 and 18 and any excess pressure in the former constrains the flap valve 54 to rise so as to allow air to pass into the second space 18 until the pressures are in equilibrium. During the return stroke of the piston in contradistinction, the pressure inside the space 18 becomes predominant and holds the flap valve in contacting relationship with the ports 56 so that air can pass only through the gauged openings 57 forming a restricted passageway, which produces the desired dash-pot operation.

The interest of the present arrangement consists in making the size of this restricted passageway at 57 independent of the sliding surfaces on the piston head. The latter has a larger surface and its sliding fit may be sufficiently accurate so as to reduce to a minimum the friction while ensuring the desired fluidtightness. It is also possible to provide on this head a suitable fluidtight arrangement of any known type. The cross-sectional area of the restricted passageway corresponds to the sum of the cross-sections of the gauged openings 57 and may be defined accurately.

Figure 6:
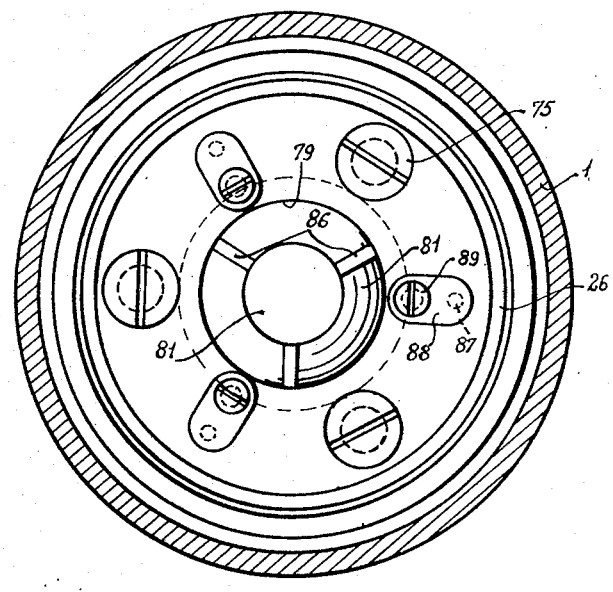
Fig. 6 is a sectional view through line VI—VI of Fig. 5.

In the modification illustrated in Figs. 5 and 6, the valve controlling the introduction of air into the cylinder is replaced by a free valve housed inside the body of the upper cylinder cover 2. This valve is made of light plastic material and includes a frustoconical head 66 and a cylindrical tail-piece 67 fitted in a metal sleeve 68. This compound tail end of the valve engages with a radial clearance an enlarged bore 69 at the end of the channel 7, while its head 66 is adapted to engage a bevelled edge 70 formed at the end of said bore opening inside a circular recess 71 formed in the cylinder 2. The side wall of said recess is tapped so as to receive a hollow screwed plug 72, the bottom of which is provided with at least one opening 73 for the passage of air, said plug being adapted to hold the valve in proximity with its seat at 70. The front surface of the valve is provided with projections 74 adapted to abut against the bottom of the hollow plug so that said valve cannot close the passage through the opening 73 when it is raised off its seat. This valve arrangement ensures perfect fluidtightness since the head 66 of the valve is deformed by reason of its plasticity when it engages and is urged against the bevelled edge forming its seat under the action of compressed air.

The end of the piston head is executed in a manner similar to that shown in Fig. 3 and it includes a solid cover 49 closing the tubular member 26 and, at a short distance outside the latter, a partition 55 provided as precedingly with ports for the passage of compressed air, said partition being secured to the solid cover 49 by means of three screws 75 with a gap between the partition and the cover the height of which corresponds to the height of the tubular stays 76 surrounding the stems of said screws. The annular space 18 surrounding the piston is limited by an annular piston head 59 castellated along its lower surface so as to form recesses 63 facing the openings 64 formed inside the tubular piston body 26 and wherethrough the annular space 18 communicates with the space or gap 58 between the cover 59 and the partition 55.

A packing 77 constituted by a rubber ring of circular cross-section is housed inside a groove 78 in the piston head the width of which groove is greater than the diameter of said cross-section while its depth is smaller so that said ring or annulus is flattened and recedes inside the groove 78 when the piston is fitted inside the bore of the cylinder 1. The annular head of the piston has a diameter which is slightly less than the bore of the cylinder and the rubber annulus which is deformable throughout its periphery provides for the guiding of said head as it slides inside the bore in the cylinder 1. This is performed in a perfectly silent manner since there is no actual metal contact between the piston and the cylinder. The part played by the annulus 77 is of greater interest as a sound-insulating member than as a fluidtight member, fluidtightness not being essential at this point.

For the passage of air between the terminal space 42 in the cylinder head and the annular space 18, the partition 55 is bored axially with a large diameter opening 79 the inner edge of which is conically bevelled at 80 so as to form a flaring seat for a conical valve 81. The latter is urged into a position closing the opening 79 as provided by a large diameter small power coil spring 82 centrally positioned inside a circular recess 83 in the solid cover 49, said coil spring engaging on the other hand a deep axial depression 84 formed in the valve body. The stroke of the latter is limited by a projection 85 on its lower surface and its axial centering is ensured by three radial fins 86 sliding inside the bore 79; said valve opposes a certain resistance to the inflow of air during compression and this may be of interest with a view to producing a suitable braking chiefly in the case of large oscillations.

The passage of air is allowed in the opposite direction, the partition 55 being provided with ports of a small cross-sectional area 87, while a further resistance against the flow of air is produced by foil members 88 yieldingly fitted over the outer openings of said ports 87 by screws 89.

As in the case of the embodiment illustrated in Figs. 3 and 4, the passage of air which produces a dash-pot operation is formed by gauged openings and consequently it is possible to ascertain very accurately the resistance opposing the flow of air, to which resistance is added the resistance produced by the foil flap valves 88. The total resistance may be accurately defined and an increase to a variable extent of the relative value of the resistance afforded by the flap valves 88, allows reducing to a variable extent the effect of the speed of flow of the fluid on the value of said resistance.

In fact, it should be reminded that the resistance of a channel to the flow of a fluid, said resistance producing a loss of head of the fluid on the upstream side, is all the larger when the speed of flow also increases. Consequently the braking of the rebounding or return movement of the piston is all the greater when the speed of movement of the suspension or, more accurately speaking, of the piston is higher. By making the resistance opposed to the flow of fluid through the long and narrow passage afforded by the ports 87, serve for braking purposes together with the elastic force developed by a flap valve which opposes a resistance independent of the speed of flow while depending only on the extent of its opening, it is possible to modify the influence of speed on the total braking effort obtained.

In the present case where the flap valves 88 are short foil members, their elastic resistance increases rapidly with the opening, but it is apparent that it is possible to provide, as shown in the modifications disclosed hereinafter, closing members the movement of which produces so rapidly an increase in the cross-sectional passage that the variations of the elastic force returning them into their starting position are negligible for a considerable change in the cross-sectional area of the channel controlled thereby.

The modification which has just been described differs in its principle but little as concerns its structure from the embodiment illustrated in Figs. 3 and 4. It distinguishes however through the possibility of a more accurate adjustment of the resistances opposing the flow of fluid and also, as mentioned hereinabove, through the possibility of modifying the action of the speed of the piston on the resistance opposed by the dash-pot operation to the displacement of the piston during its return stroke. Furthermore, a certain braking is obtained during the compression stroke.

The further modification illustrated in Fig. 7 differs from that illustrated in Figs. 3 and 4, in addition to the presence of the sound-insulating annulus 77 on the annular head of the piston as in the case of the first modification and to the substitution for the yielding valve 54 of a foil washer 90 for the closing of the openings 56, through the mounting of the valves over the ports of a restricted cross-sectional area; each of these valves is formed by a member of plastic material of a small diameter, having the shape of a flat-bottomed cup 91 housed in the bottom of a cylindrical recess opening into the outer surface of the partition 55 axially of the corresponding small diameter opening 57 so as to engage the output of said opening at the bottom of the recess under the action of the thrust exerted by a spring 92. Said spring 92 engaging the flat-bottomed valve cup bears on a threaded plug 93 provided axially with a spring-guiding stem 94 limiting the rising movement of the valve 91, said plug being screwed inside a tapping at the entrance of the housing of the cup. Diametrically opposed extensions 95 of said housing outside the plug 93 form channels (Fig. 8) for the passage of the compressed air which may flow through the small diameter port 57 when the pressure of air is sufficiently high and raises the valve 91. During the return movement of the piston, the resistance opposing the flow, ensuring the operation of the dash-pot arrangement described, depends largely on the gauging of the valve whereby it is possible to adjust said resistance. The cross-sectional area afforded for said flow is however small so that said resistance depends also largely on the speed.

In the third modification illustrated in Figs. 9 and 10, the head of the piston carries a plurality of sound-insulating annuli 77 engaged inside suitable grooves. As precedingly, the upper end of the tubular piston 26 includes a solid cover 49 fitted inside the bottom of the bore 50 of a slightly enlarged diameter formed in the said body 26, said cover being held inside said recess 50 through welding. The partition provided with passageways for the compressed air is held at a small distance from said cover against the shoulder formed by a further recess 96 at the upper end of the piston body 26, the diameter of which recess 96 is somewhat larger than that of the recess 50; the partition 55 is held fast with reference to the solid cover 49 by two screws 97, screwed into the solid cover 49.

The partition 55 is provided with two large diameter openings 98 in which are mounted in opposite directions two gauged valves constituted as follows: each valve includes a shouldered body 99 fitted inside one of the openings 98 in the partition 55 and held in position, through abutment of its shoulder against the corresponding outer surface of said partition, by a bridge member 100 secured by means of two screws 101 (Fig. 10) screwed into the partition 55. Each valve body 99 is provided in substantial horizontal register with its shoulder with an inner collar 102 having a rounded edge and defining a channel the large cross-sectional area of which is entirely filled by the rounded periphery of the conical head 103 or 104 of a valve which is urged back into its closing position by a spring 105 or 106. The bearing member for last-mentioned valve spring is constituted by the bottom of a shell 107 which is outwardly threaded so as to be screwed inside a tapping of the valve body 99 at the end thereof remote from the bridge member 100. The bottom of said shell is provided with ports 108 for the passage of compressed air while the central section of said bottom is solid and serves as a bearing for the spring 105 or 106. Through this central section passes a screw 109 including an elongated round stem 110 slidingly engaging the tailpiece 111 of the valve head inside an axial opening formed in the latter and communicating with the outside through radial ports 112. The valve heads subjected to the thrust of the cooperating springs abut when inoperative against the bridge member 100 and occupy then a position for which they close entirely the passage for the compressed air. The valves as stated hereinabove, face opposite directions. The valve 103, the spring 105 of which is comparatively weak, opens only inwardly under the action of an overpressure inside the terminal space 42 in the cylinder. The other valve 104 facing the opposite direction and subjected to the action of a stronger spring 106 can only open outwardly under the action of a large overpressure inside the annular space 18. The first valve 103 opens thus readily so as to equilibrate the pressures during the compression stroke while the second valve 104 opposes a considerable resistance to the exhaust of the compressed air contained inside the annular space 18 during the return or rebounding stroke. Said valve 104 opposes the flow of compressed air, a resistance which does not depend in practice on the speed, the cross-sectional area of the channel increasing speedily with the lift of the valve. Thus, during the dash-pot operation, the resistance opposed to the return movement of the piston is practically constant, whatever may be the speed of the piston and this bestows the suspension with a maximum resiliency even in the case of the application of a harsh shock.

It is also possible to adjust the tension of each of the springs 105 and 106 by screwing more or less the shell 107 against the bottom of which said spring bears, while the guiding stem 110 may be adjusted subsequently, taking into account the modified position occupied by the shell, said adjustment being provided through operation of the screw 109. In particular, the braking of the return or rebounding movement of the piston may be adjusted very accurately to the desired value.

In a fourth modification illustrated in Figs. 11 and 12, the apertured partition which provides for the passage of air is rigid with the solid cover 49. It forms a thick member fitted inside the bottom of the bore 50 and is held therein by welding. A blind bore in the outer surface of the partition forms a central chamber 113 communicating with the periphery of the piston underneath the annular head 59 through radial ports 64 extending into said chamber. The opening of said blind bore is tapped so as to carry an annular shouldered member 114 including a threaded section screwed into said tapping of the bore and the inner edge of which is bevelled at 115 so as to form a valve seat. The head of a valve 116 is urged against said seat by a spring 117 of a large diameter, said highly yielding spring being held by and centered inside a slightly recessed part 118 in the bottom of the central chamber 113.

The tail end or stem of the valve 119 has a diameter which is smaller than the bore 120 in the annular member 114 and it is guided in said bore 120 through radial fins 121. Said stem is hollow so as to house an auxiliary valve 122 therein. This valve 122 is a cup-shaped flat-bottomed valve as in the case of the valve 91 of Fig. 7 and it occupies the bottom of the bore 123 in the valve 116 above the opening of a small diameter port 124 passing through the head of the said valve 116; said valve 122 is urged towards said port by a spring 125 bearing against a threaded plug 126 screwed inside a tapping at the outlet end of the bore 123 in the valve 122. Said plug carries a stem 127 forming a guide for the spring 125 and limiting the lift of the flat-bottomed valve. In its raised position, the said valve 122 uncovers through its edge the radial ports 128 formed between the fins 121 in the outer valve.

It is apparent that the valve which is operative for the passage of air during its compression stroke has a large diameter and is held on its seat by a slight elastic thrust. In contradistinction, the resistance opposing the passage of compressed air between the annular space 18 and the terminal space 42, during the resilient return movement of the piston, is due partly to the gauging of the valve and partly to the braking provided by the ports 124 and 128 as in the case of the modification illustrated in Fig. 7. However, the structure is simplified through the fact that one of the valves is contained inside the other. The valves and the member 114 form thus a system which may be machined separately and positioned as a unit inside the cover of the piston.

In the fifth modification, illustrated in Figs. 13 and 14, the solid cover 49 and the partition 53 provided with the passageways for the compressed air are designed in the same manner as in the embodiment illustrated in Fig. 3 or the modification illustrated in Fig. 7. The channels for feeding compressed air through the partition 55 are constituted by two diametrically opposed ports 129 located on an outer circle and four ports 130 arranged on an inner circle, the said ports 130 being interconnected by two annular grooves 131 and 132 machined respectively in the opposite surfaces of the partition. The outer ports 129 are covered on the outer surface of the partition 55 by a blade or foil 133 held along its inner edge by the central screw 51, said blade or foil being sufficiently stiff so as to engage the corresponding openings of said ports with a high elastic force. The ports 130 on the inner circle are covered on the inner surface of the partition 55 by an annular washer made of metail foil 134, the diameter of which is larger than that of the groove 131.

The air flows with a large throughput as soon as the washer 134 begins rising during the compression stroke under the pressure of the air compressed inside the space 42, which pressure is exerted throughout the periphery of said washer covering the groove 131 which communicates with said space 42 through the ports 130 and the groove 132 on the opposite side of the partition, which groove 132 is partly uncovered by the foil or blade 133. The blade 134 may oppose a sufficient resistance so as to produce a predetermined braking and to limit the compression stroke of the piston, which allows tautening the suspension and thereby increasing the stability of the automobile in certain cases.

When the arrangement operates as a dash-pot, on the contrary, the resistance opposed by the blade 133 is considerable and requires application of a large difference in pressure. The braking of the flow of air is due solely to the elastic resistance of the stiff blade of metal foil 133 and does not depend in practice on the speed of displacement of the piston.

Figure 15:
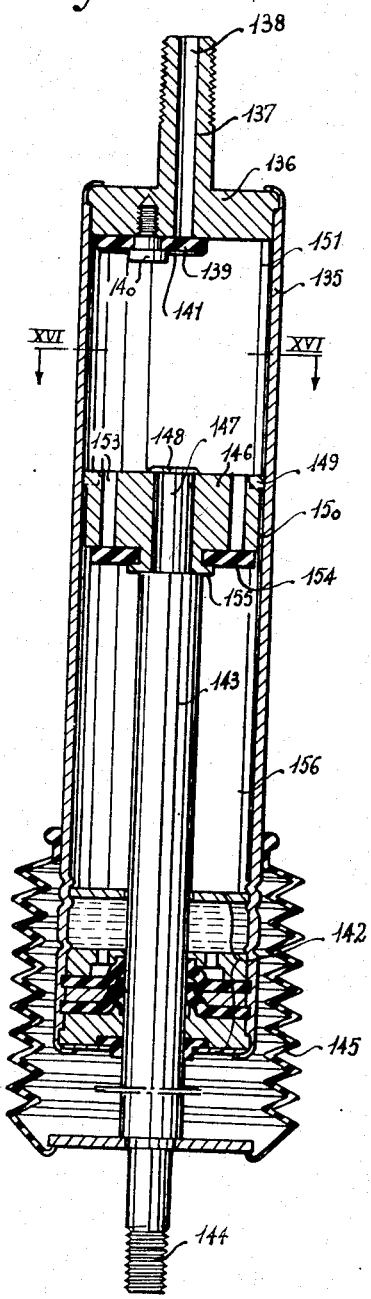
Fig. 15 is an axial sectional view of a dash-pot system according to my invention, adapted to be associated with a suspension of any type, which is not illustrated.
Figure 16:
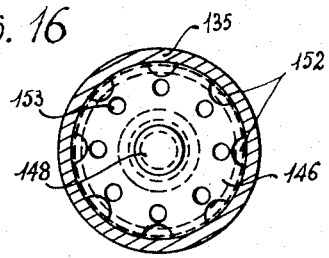
Fig. 16 is a sectional view through line XVI—XVI of Fig. 15.

The apparatus illustrated in Figs. 15 and 16 forms a separate dash-pot arrangement adapted to be associated with any suspension, the suspension not being illustrated. As in the case of the compound apparatus, the body of the apparatus is constituted by a cylinder or tube 135 the upper end of which is closed by a cylinder head 136 over which the end of the actual cylinder is crimped and which carries an outer rod 137 which is threaded so as to serve as an attaching member. This rod is provided with an axial bore or channel 138 closed by a flap valve including a rubber disc 139 held fast against the inside of the cylinder head by an eccentric screw 140 the head of which engages a metal foil 141 covering said disc. The outer end of the channel 138 in the attachment rod may be closed by a fluidtight plug which is not illustrated.

The other end of the tube 135 carries means for the fluidtight guiding of the piston as illustrated at 142, said guiding means being of the type described hereinabove for the compound apparatus, and it allows the axial passage therethrough of the rod 143 of a piston sliding inside the cylinder. The outer end of the said piston rod is provided with a thread 144 for its attachment, and it is connected with the wall of the cylinder 135 by protecting bellows forming a casing of the above-described accordion type.

The piston 146 is a solid member fitted through a central bore on the end 147 of the piston rod which is cut from the bar, said piston engaging the shoulder formed by said end while it is held in position by a crimping at 148 of said cut end. The piston body 146 is cylindrical so as to slide inside the cylinder 135 with a minimum friction. It retains the diameter at which it has been cut only over a certain length starting from its terminal surface at 149; this normal diameter section is followed by a section cut to a smaller diameter so as to form with the inner wall of the cylinder an annular passageway 150 of a reduced breadth forming a restricted passageway for the air. Said restricted passageway communicates with the section of the cylinder 151 facing the outer end of the piston through peripheral notches 152 cut in the large diameter section 149 (Fig. 16). A number of ports 153 arranged in annular formation extend through the body 146 of the piston and open into register with a flap valve constituted by a rubber washer 154 held in its central section underneath a crimping part 155 formed by a collar on the piston body.

The arrangement thus described is to be associated with elastic suspension means such as a spring suspension of any suitable type, which is not illustrated, or even with a suspension already provided with damping means. The arrangement described has for its object to allow the compressional movement to be executed freely, i. e. to allow a free elastic flexing of the suspension while only the resilient return movements are braked.

An inner pressure of a few kilograms per sq. cm. is established inside the arrangement before it is assembled or after positioning thereof, the pressure being produced by blowing air into the axial channel 138. The introduction of air is not prevented by the flap valve 139 which rises immediately and which prevents escape of the air once it has entered the cylinder. The piston remaining stationary, the pressures in the two chambers become equal since the air entering the upper end 151 of the cylinder passes freely through the piston and raises the valve 154 off its seat so as to fill the lower space 156 of the cylinder at the same pressure. However, the flow in the opposite direction between the two chambers 156 and 151 is not possible otherwise than through the restricted peripheral passageway 150.

Consequently, the suspension, when it moves, is subjected to no braking action during its compression stroke since the piston enters then the cylinder to a more considerable extent, and the air contained inside the chamber 151 may flow freely into the chamber 156 and raise the valve 154 without meeting any resistance. On the contrary, during the return movement, the flow is limited by the restricted throughput through the passageway 150 submitted then to the increased pressure due to the compression of air inside the chamber 156. The arrangement operates thus as a dash-pot and allows the suspension to move freely under the action of compression while it opposes a constant braking action to the return movement.

Figure 17:
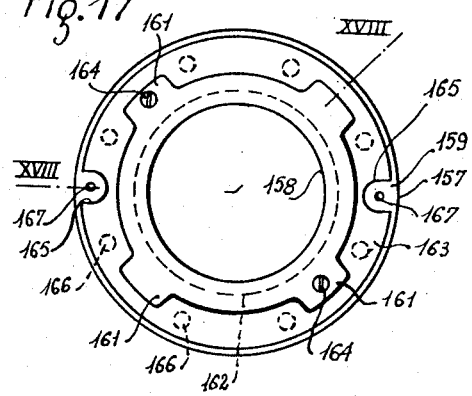
Fig. 17 is a plan view on the flap valve side of a modification of the piston head.
Figure 18:
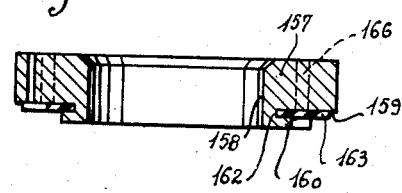
Fig. 18 is a sectional view through the broken line XVIII—XVIII of Fig. 17.

The modification in the piston head illustrated in Figs. 17 and 18 is applicable as well to a combined apparatus of the first described types and to the separate dash-pot arrangement described hereinabove.

In said Figs. 17 and 18, the piston head is constituted by an annular member 157 the outer diameter of which is defined with reference to the bore in the cylinder in a manner such as to provide a sliding fit. This member is mounted on a bearing surface obtained on the lathe, either at the end of the tubular piston body 26 of a combined arrangement of the type illustrated in Figs. 1, 2, 3, said tubular body being closed by a solid disc as described or else at the end of the piston rod 143 of the separate dash-pot arrangement of Fig. 15. Its bore 158 corresponds with the diameter of said bearing surface so as to ensure a tight fit and the annular member is carried by said bearing surface through a crimping of said tubular piston body or piston rod over its outer surface. The inner surface of the annular member 157 is provided with a flat clearance 159 on the outside of the remaining projecting collar 160, four radial bosses 161 projecting outside said collar through the clearance. These bosses and this collar are provided along the surface of the clearance with a transverse groove 162. Said groove is engaged by the inner edge of a rubber washer 163 forming a flap valve and engaging the groove through an elastic diametrical expansion thereof so as to lie flat against the surface of the clearance 159. The outer periphery of said washer 163, which is held in a predetermined angular position by two screws 164 passing through two opposite bosses 161 of said washer, is provided at 45° with reference to said bosses with two notches 165 in diametrically opposed relationship. The piston head is provided with a series of longitudinal ports of a comparatively large diameter 166 opening under the washer 163 and forming together a passagewaty for the air having a large cross-sectional area, said ports closing during the return movement and opening without meeting any resistance during the compression stroke. Two small gauged ports 167 opening into the notches 165 form together a restricted passageway ensuring dash-pot operation.

The modified embodiment of the piston head which has just been described and also that described with reference to Figs. 3 and 4, show the advantage that the total cross-sectional area of the restricted passageway may be defined accurately and remain perfectly constant since it runs no risk of being modified by the presence of lubricant for instance, as in the case where said passageway is adjacent to the sliding surfaces on the piston head. However, the braking of the return movement is all the harsher when the suspension moves more quickly.

The examples illustrated show that it is possible not only to adjust the braking of the return movement to any desired value for a predetermined speed of movement, but also to make this braking depend more or less on said speed so as to tauten more or less this suspension when it is subjected to sudden shocks or else with a view to retaining the full yieldingness of the suspension even in the case of shocks by giving in this latter case the braking action a value which is independent of the speed of movement on the suspension.

What I claim is:

1. In a pneumatic suspension device for vehicles having a cylinder closed at one end only and provided with packing means at its open end, a piston having a head slidingly mounted in said cylinder and a body fluid-tightly extending through said packing means, said cylinder having an extension of increased internal diameter, said extension being formed with peripheral grooves and said packing means comprising a first ring seated in said extension at a short distance from its outer end and on the axially inner side of the peripheral grooves and provided with an outwardly facing recess along its inner periphery and with ports connecting said recess with the inner surface of the first ring, a second ring fitted in the said extension axially outwardly of the peripheral grooves, a third ring threadedly engaging the said extension radially outwardly of the second ring to hold said second ring in position, a system clamped between the two first rings and including yielding washers and an intermediate washer held between the peripheries of the latter, said yielding washers being fitted through their outer peripheries inside the peripheral cylinder grooves and their inner peripheries engaging elastically the outer periphery of the piston body and the recess in the first ring to ensure fluid-tightness between the latter and the cylinder bore, a non-fluid-tight rigid washer extending across the outer end of the annular chamber in the cylinder bore on the inside of the first ring to form with the latter a grease chamber communicating with the recess in said first ring through the port in the latter.

2. In a pneumatic suspension device for vehicles having a cylinder closed at one end only and provided with packing means at its open end, a piston having a head adapted to slide in said cylinder and a tubular body extending through said packing means, said head being rigidly mounted on the inner end of said body and said body defining an annular clearance with the cylinder, a solid inner wall disposed in said body spaced from the inner end thereof to define a chamber within said body, an end wall closing the end of said body and spaced from said inner wall to define with said piston head a terminal space within said cylinder and to define with said inner wall an intermediate space, said body being formed with ports to place said intermediate space in open communication with the annular clearance around said body between said head and said packing means, and said end wall being formed with two separate passageways, one of said passageways allowing air compressed in the terminal space to flow into the annular space against a slight resistance and the other of said passageways allowing air compressed in the annular space to flow into the terminal space against a higher resistance.

3. A pneumatic suspension device as defined in claim 2, wherein said end wall is provided with an enlarged opening, a large diameter valve cooperating with said opening, said valve comprising a longitudinally-ported head engaging said opening on the side facing the intermediate space, a hollow radially-perforated stem and radial fins on the latter fitted inside said opening in the end wall, a yielding spring bearing on the solid inner wall and urging said valve against the edge of the end of said opening in the end wall facing the intermediate space, a flat bottomed inner valve fitted inside the hollow valve stem, a plug threadedly engaging the end of the hollow stem further from the head of the first valve, a spring bearing against said plug and engaging the flat bottomed valve, said last-mentioned valve uncovering when lifted the radial perforations in the hollow stem, the large diameter valve and the inner valve providing respectively for a substantially free flow of air from the terminal space into the annular space during the compression stroke of the piston and for a throttle passage of air from the annular space into the terminal space during the recoil stroke of the piston.

4. A pneumatic suspension device according to claim 2, in which said passageway for the flow of air into the terminal space comprises a large diameter opening in said end wall, a tubular valve seating member fitted inside the opening in the end wall, a valve having a large diameter and a thin peripheral edge adapted to engage and close said seating member, a strong spring urging said valve into its closed position against the pressure prevailing in the annular space a large cross-sectional area being provided for the passage of air from the annular space into the terminal space for a reduced lift of said valve against a resistance which is practically independent of the speed of the piston.

5. A pneumatic suspension device according to claim 2 further comprising a collapsible fluid-tight casing connecting the outer end of the cylinder with the outer closed end of the tubular body of the piston, and wherein said closed end of the tubular body is formed with a longitudinal bore adapted to connect the chamber within said tubular body with the outer atmosphere, the lateral wall at the outer end of said tubular body being provided with a port connecting said chamber to the space between said collapsible fluid-tight casing around said body, and a cover tightly closing said longitudinal bore.

References Cited in the file of this patent

UNITED STATES PATENTS

| 2,009,091 | Martin et al. | July 23, 1935 |
| 2,186,011 | De Port | Jan. 9, 1940 |
| 2,537,491 | Thornhill | July 9, 1951 |

FOREIGN PATENTS

| 573,275 | Great Britain | Nov. 14, 1945 |